Patented June 4, 1940

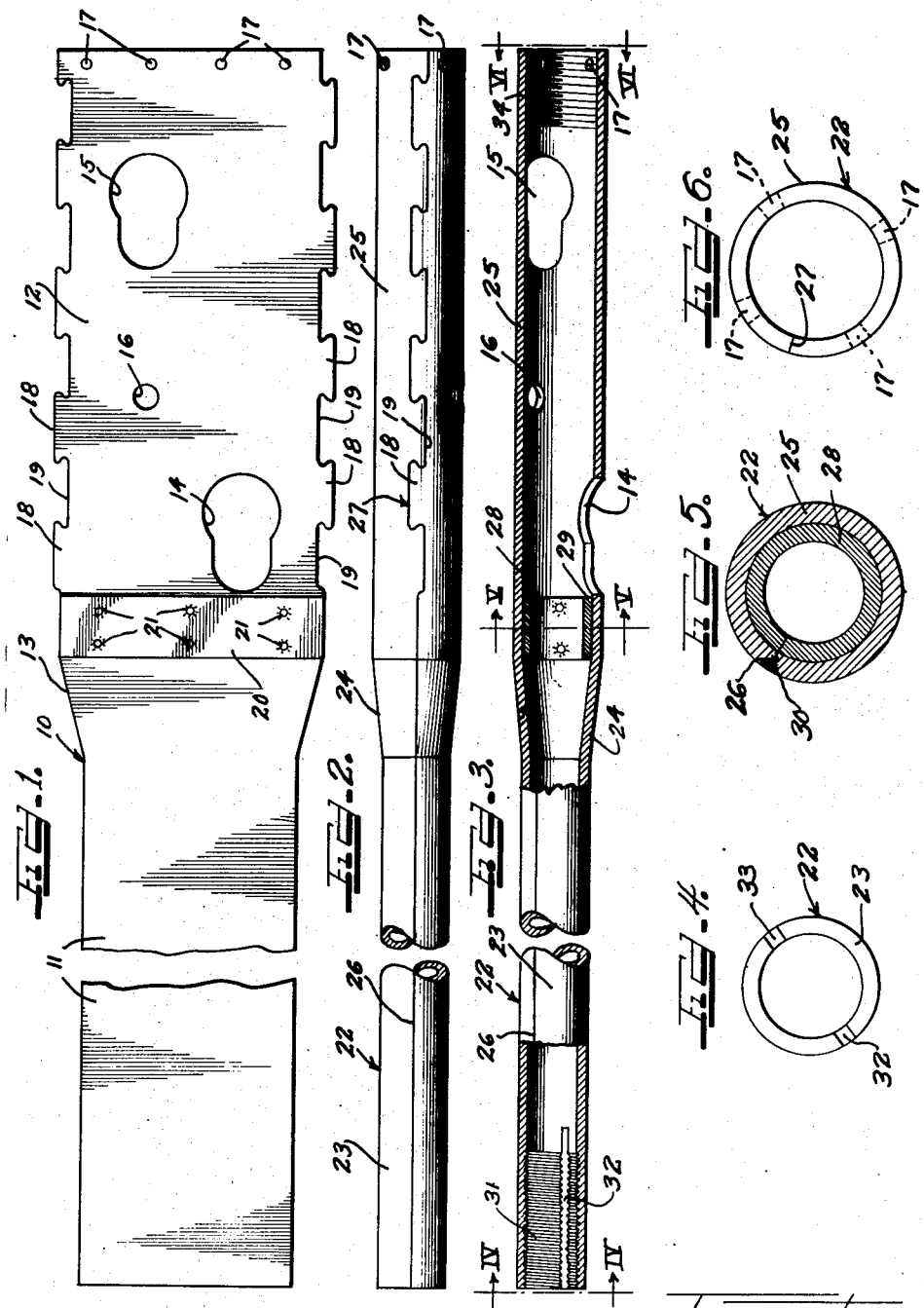

2,202,909

UNITED STATES PATENT OFFICE 2,202,909

DRAG LINK BODY AND METHOD OF MAKING SAME

George H. Hufferd and Matthew P. Graham, Detroit, Mich., assignors to Thompson Products, Incorporated, Cleveland, Ohio, a corporation of Ohio Application September 27, 1937, Serial No. 165,839

11 Claims. (Cl. 29—152)

This invention relates to the manufacture of drag link or reach rod body members and particularly relates to a combined tie rod and drag link body member.

It has heretofore been the practice in the production of drag links to upset the ends of solid metal rods for forming tubular housings of enlarged diameter or to weld tubular sockets on the ends of a solid rod.

According to this invention a drag link body member is formed from a flat sheet of metal so cut and stamped as to form, when rolled or bent to bring the longitudinal edges thereof into juxtaposition, a tubular socket of enlarged diameter and a smaller rod portion extending therefrom.

In carrying out the invention a flat strip or sheet of metal such as steel is cut to form an elongated tail portion of reduced width extending from one end of the strip into spaced relation from the other end of the strip. The tail portion tapers into the end portion of the strip that is not reduced in width.

The longitudinal edges of the unreduced portion are stamped to form alternating complementary dovetailed tabs and grooves therealong. Keyhole openings are punched through the unreduced portion of the strip to form openings giving entrance to the socket portion of the finished drag link body. Holes for a locking pin can be punched through the outer end of the unreduced portion of the strip and if desired a hole for a lubricant fitting can also be punched through the unreduced portion of the strip.

A flat band of metal is spot-welded or otherwise integrally secured transversely across a face of the unreduced portion of the strip adjacent the tapered portion thereof.

The thus formed flat blank is then rolled or otherwise formed around a cylindrical mandrel to bring the opposite longitudinal edges thereof into juxtaposition. The dovetailed tabs and grooves of the unreduced portion are forced into interlocking relation and the transverse band is rolled or formed with the strip into a ring shape on the inside of the body member.

The tail portion of the sheet can have the abutting edges thereof welded, brazed or otherwise secured together. If desired the dovetailed tabs may be welded, brazed or otherwise secured in the complementary grooves.

The ends of the thus formed tubular body member are then interiorly threaded and the end of the tail portion of the body member may be slotted if desired.

The band at the inner end of the unreduced portion of the tubular member serves as an abutment for a ball seat.

It is then an object of this invention to provide a drag link body member formed from sheet metal.

Another object of this invention is to provide a method of making drag link bodies from sheet metal.

A further object of this invention is to provide a flat metal blank from which a drag link body can be formed.

Another object of this invention is to provide a combined tie rod and drag link body member having an enlarged socket end integral with a rod portion of reduced diameter.

Another object of this invention is to provide a tubular drag link body member having an abutment sleeve welded therein.

Other and further objects of this invention will become apparent to those skilled in the art from the following detailed description of the annexed sheet of drawings which discloses a preferred embodiment of the invention.

On the drawing:

Figure 1 is a broken plan view of a metal blank used for forming drag link body members according to this invention.

Figure 2 is a broken side elevational view of a drag link body member according to this invention.

Figure 3 is a broken side elevational view of a drag link body member according to this invention with parts shown in vertical cross-section.

Figure 4 is an end elevational view taken along the line IV—IV of Figure 3.

Figure 5 is a cross-sectional view taken along the line V—V of Figure 3.

Figure 6 is an end elevational view taken along the line VI—VI of Figure 3.

As shown on the drawing:

In Figure 1 the reference numeral 10 designates generally a strip of metal cut and stamped to form a blank from which a drag link body member can be produced. The blank 10 has an elongated tail portion 11 of reduced width, a wider head portion 12 at one end thereof and a tapered intermediate portion 13 between the tail portion 11 and the head portion 12.

Keyhole openings 14 and 15 are punched in the head portion 12 of the blank 10. The keyhole opening 14 is formed near the inner end of the head portion 12 along one side thereof while the keyhole opening 15 is formed near the outer end of the head portion 12 along the other longitudinal side thereof.

A hole 16 is formed through the head portion 12 of the blank 10 intermediate the keyhole openings 14 and 15 for receiving a lubricant fitting (not shown) therein.

A plurality of small holes 17 may be formed through the outer end of the head portion 12 along the end wall thereof. These openings 17 can receive cotter or locking pins therethrough for a purpose to be hereinafter described.

The longitudinal sides of the head portion 12 of the blank 10 are stamped to provide alternating dovetailed tabs 18 and dovetailed grooves 19 therein. The tabs and grooves 18 and 19 are arranged in complementary succession on opposite sides of the head portion 12 so as to interlock with each other when the sides are brought together.

A metal band 20 is spot-welded as at 21 or otherwise secured transversely across a face of the head portion 12 of the blank 10 adjacent the tapered portion 13 of the blank so that one edge of the band 20 is adjacent the keyhole opening 14.

The thus shaped and punched blank is next rolled or bent around a mandrel (not shown) into a tubular drag link body designated generally by the reference numeral 22 in Figure 2. The drag link body member 22 comprises an elongated rod portion 23, an intermediate frustoconical portion 24 and a tubular housing portion 25 of greater diameter than the rod portion 23.

In the rolling operation, the longitudinal edges of the blank 10 are placed in abutting relation to form a straight seam 26 along the rod portion 23 and frusto-conical portion 24 and an interlocking seam designated generally by the reference numeral 27 along the housing portion 25. The interlocking seam 27 is composed of the interlocking dovetailed tabs 18 and complementary dovetailed grooves 19.

As best shown in Figures 3 and 5 the band 20 that was secured to a face of the blank 10 is rolled into a cylindrical sleeve 28 on the inside of the drag link body member 22, with one edge of the sleeve 29 adjacent the keyhole opening 14 of the housing 25. The edge 29 serves as an abutment for a ball stud seating disk (not shown) that is disposed in the housing 25 of the body member. A ball stud can project through the keyhole slot 14 for connection with an arm or rod member secured to a front wheel mounting. A second ball stud can project through the opening 15 for connection with a steering arm.

The straight seam 26 of the body member can be welded as at 30 (Figure 5) to join the abutting edges together in integral relation. If desired the interlocking seam 27 can also be welded but the dovetailed tabs and grooves are sufficient to hold the housing 25 in shape.

The end of the rod portion 23 is interiorly threaded as at 31 in Figure 3 for receiving the shank of a tie rod joint housing therein. This threaded end portion can also have diametrically opposite slots 32 and 33 formed therein as shown in Figures 3 and 4 to receive a locking pin therethrough (not shown) which pin can also extend through the shank portion of the tie rod joint housing. Furthermore the slots 32 and 33 permit the clamping of the end of the rod 23 around the shank of the tie rod housing.

The outer end of the housing portion 25 of the body member 22 can also be interiorly threaded as at 34 in Figure 3.

As shown in Figure 6, the holes 17 in the finished body member 22 provide two pairs of diametrically opposite openings through the end of the housing portion 25. These openings are adapted to receive a cotter pin or a locking pin therethrough for locking a plug member (not shown) that is threaded in the threaded end 34 of the housing 25 to close the housing.

From the above description it should be understood that a drag link body is formed from a prefabricated flat strip of metal by a simple rolling or bending operation. While dovetailed grooves and tabs have been illustrated for sealing together the housing portion of the body member, it should be understood that other types of interlocking seams can be used, and that, if desired, the housing portion can be formed with flat longitudinal sides that are butt welded together in the same manner as are the flat sides of the tail portion of the blank.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. The method of making a link body which comprises punching an elongated opening through the wide portion of an elongated strip of metal having an end portion of greater width than the rest of the strip, placing a flat metal band transversely across a face of the wide portion of the strip between the punched opening therein and the narrower portion of the strip, rolling the thus formed blank into a tubular form with the band of metal on the inside of the tube, placing the longitudinal edges of the blank in contiguous relation and uniting said edges together thereby providing a body member having an enlarged tubular socket end and a rod portion of smaller diameter extending therefrom, said metal band forming a sleeve in the socket portion of the body member to provide an abutment for a bearing member housed in the socket portion.

2. The method of making a link body which comprises cutting an elongated flat strip of metal to form an elongated tail portion of reduced width extending from one end of the strip into spaced relation from the other end thereof, punching a keyhole slot through the unreduced portion of the strip, welding a flat band of metal transversely across a face of the unreduced portion of the strip between the keyhole opening and the tail portion of the strip, rolling the thus formed blank into a tubular shape with the longitudinal edges of the blank in abutting relation and welding the abutting edges together whereby said tail portion of the strip provides an elongated hollow rod and said unreduced portion of the strip provides a tubular socket of greater diameter than the rod while said band of metal provides a sleeve in the socket adapted to function as an abutment member.

3. The method of making a link body which comprises cutting a flat sheet into a blank of metal having an elongated tail portion extending from one end of the sheet into spaced relation from the other end and a wider head portion extending from the other end of the sheet to the tail portion, stamping the longitudinal edges of the head portion to form alternating complementary dovetail tabs and grooves therealong, punching spaced elongated openings in said head portion between the longitudinal edges thereof, welding a band of metal transversely across a face of the head portion between the inner elongated opening and the tail portion, forming the sheet into a tube with the longitudinal edges of the tail portion in abutting relation and with the complementary tabs and grooves of the head portion in interlocking relation, and welding together the abutting edges of the tail portion.

4. The method of making a link body which comprises cutting a flat sheet of metal into a blank having an elongated tail portion of reduced width extending from one end of the sheet into spaced relation from the other end and a tapered portion between the tail portion and the unreduced end of the sheet, stamping the longitudinal edges of the unreduced portion of the sheet to form alternating complementary dovetailed tabs and grooves therealong, punching spaced elongated openings in said unreduced portion, welding a strip of metal transversely across the unreduced portion adjacent the tapered portion, rolling the sheet into tubular form with the longitudinal edges of the tail portion in abutting relation and with the complementary tabs and grooves of the unreduced portion in interlocking relation and welding the abutting edges of the tail portion together.

5. The method of making a link body which comprises stamping keyhole slots in the wide end portion of a flat strip of metal having an end portion having a greater width than the remaining portion of the strip, punching small holes along the end edge of the wide portion of the strip, stamping alternating dovetailed grooves and tabs along the longitudinal edges of the wide portion of the strip in complementary relation, spot-welding a band of metal at the inner end of the wide portion of the strip, bending the thus provided flat metal blank into a tube with the band of metal on the inside of the tube and with the longitudinal edges of the blank in abutting relation, said dovetailed grooves and tabs being in interlocking relation and tapping the ends of the tube to cut threads therein.

6. A link body comprising a one-piece elongated tube having walls of uniform thickness formed from a flat sheet of metal, said tube having an end portion of greater diameter than the remaining portion of the tube for defining a tubular socket, an interlocking seam joining the ends of the socket portion together and a metal sleeve welded in said socket at the inner end thereof.

7. A link body member comprising a hollow rod portion, a frusto-conical portion at the end of the rod integral therewith and tapering outwardly therefrom, a tubular socket portion integral with the base of the frusto-conical portion and extending therefrom, said rod portion and said frusto-conical portion having a welded seam joining the abutting ends thereof and said socket portion having an interlocking seam joining the abutting ends thereof.

8. The method of making a tubular link rod which comprises cutting a flat metal blank to form therefrom an elongated tail portion and a head portion wider than the tail portion without changing the thickness of the blank, placing a flat metal band transversely across a face of the wide portion of the blank, bending the blank into a tube with the longitudinal edges thereof in contiguous relation and with the band of metal on the inside of the tube, and uniting said longitudinal edges of the tube to provide a link rod having an enlarged tubular socket with a sleeve therein and a rod portion of smaller diameter extending from the socket.

9. A link body member having walls of uniform thickness formed from a flat sheet of metal comprising a hollow rod portion, an outturned portion at an end of the rod portion, a socket portion integral with the periphery of the outturned portion and extending therefrom, said socket portion having a larger diameter than the rod portion, and an interlocking seam fixedly joining the abutting ends of the metal sheet along said socket portion to resist radial expansion of the socket portion.

10. The method of making a tubular link rod which comprises cutting a flat sheet of metal into a blank having an elongated portion of reduced width and an end portion wider than the elongated portion, punching a hole in the end portion of the blank, cutting complementary dovetailed tabs and grooves along the longitudinal edges of the end portion, rolling the thus formed blank into a tubular shape with the longitudinal edges of the blank in abutting relation and with the tabs and grooves of the end portion in interlocking relation to provide a hollow rod with an enlarged diameter tubular end socket portion having an opening through the side wall thereof.

11. The method of making a tubular link rod which comprises cutting a flat sheet of metal into a blank having an elongated portion, a shorter end portion of increased width, and a divergent portion joining the elongated portion with the end portion, cutting complementary dovetailed tabs and grooves along the longitudinal edges of the shorter end portion, rolling the blank into a tubular shape with the longitudinal edges of the blank in contiguous relation, said tubular member having an elongated rod portion formed from the elongated portion of the blank, an outturned portion at an end of the rod portion formed from the divergent portion of the blank and an enlarged diameter tubular end socket portion extending from the periphery of the outturned portion formed from the shorter end portion of the blank, interlocking the tabs and grooves along the contiguous edges of the tubular member to resist radial expansion of the socket portion, and securing an abutment sleeve in the socket portion adjacent the outturned portion.

GEORGE H. HUFFERD.
MATTHEW P. GRAHAM.